US010526922B2

(12) United States Patent
Zippel

(10) Patent No.: US 10,526,922 B2
(45) Date of Patent: Jan. 7, 2020

(54) METHOD FOR CLEAR POSITION DETERMINATION AND IDENTIFICATION OF A TURBINE BLADE

(71) Applicant: LUFTHANSA TECHNIK AG, Hamburg (DE)

(72) Inventor: Tim Frederik Zippel, Hasloh (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 16/330,772

(22) PCT Filed: Sep. 4, 2017

(86) PCT No.: PCT/EP2017/072052
§ 371 (c)(1),
(2) Date: Mar. 6, 2019

(87) PCT Pub. No.: WO2018/046423
PCT Pub. Date: Mar. 15, 2018

(65) Prior Publication Data

US 2019/0345844 A1 Nov. 14, 2019

(30) Foreign Application Priority Data

Sep. 6, 2016 (DE) ........................ 10 2016 216 895

(51) Int. Cl.
*G01M 15/14* (2006.01)
*F01D 25/28* (2006.01)
(Continued)

(52) U.S. Cl.
CPC ........... *F01D 25/285* (2013.01); *F01D 5/005* (2013.01); *F01D 5/30* (2013.01); *F01D 9/00* (2013.01);
(Continued)

(58) Field of Classification Search
CPC ..................................................... G01M 15/14
(Continued)

(56) References Cited

U.S. PATENT DOCUMENTS 4,907,456 A * 3/1990 Rozelle .................. G01H 1/006
73/660
5,349,850 A * 9/1994 Young .................... G01B 11/00
73/112.01
(Continued)

FOREIGN PATENT DOCUMENTS

DE 102011103003 A1 11/2012
DE 102011114541 A1 4/2013
(Continued)

*Primary Examiner* — Eric S. McCall
(74) *Attorney, Agent, or Firm* — Leydig, Voit & Mayer, Ltd.

(57) ABSTRACT

A method for a position determination of a turbine blade of a high-pressure turbine stage of a gas turbine that is connected to a high-pressure compressor via a shaft, wherein each turbine blade of the high-pressure turbine is recorded on a record card with a relative position. The method includes: determining a position of a blade lock of a stage of the high-pressure compressor, where the stage is selected such that, when the gas turbine is mounted, the blade lock is brought into view of a boroscope, which is guided through a boroscope opening on the gas turbine by rotating the shaft, and so that the blade lock can be identified; and marking that turbine blade on the record card that is in view of a second boroscope, which is guided through a second boroscope opening on the gas turbine when the blade lock is in view of the boroscope.

7 Claims, 3 Drawing Sheets

(51) Int. Cl.
*F01D 5/00* (2006.01)
*F01D 9/00* (2006.01)
*F01D 5/30* (2006.01)

(52) U.S. Cl.
CPC ...... *F05D 2230/72* (2013.01); *F05D 2260/80* (2013.01)

(58) Field of Classification Search
USPC ........................................................ 73/112.01
See application file for complete search history.

(56) References Cited

U.S. PATENT DOCUMENTS

| | | | | |
|---|---|---|---|---|
| 7,140,240 | B2 | 11/2006 | Gustafson et al. | |
| 9,016,560 | B2 | 4/2015 | Kotian et al. | |
| 9,719,774 | B2 | 8/2017 | Ullrich et al. | |
| 9,939,349 | B2 | 4/2018 | Mueller et al. | |
| 2004/0051525 | A1* | 3/2004 | Hatcher | G01N 27/902 324/262 |
| 2009/0078052 | A1* | 3/2009 | Twerdochlib | G01H 1/003 73/660 |
| 2009/0314092 | A1* | 12/2009 | Twerdochlib | G01H 1/006 73/659 |
| 2010/0076703 | A1* | 3/2010 | Twerdochlib | G01H 1/006 702/56 |
| 2012/0224048 | A1* | 9/2012 | Trzcinski | F01D 5/005 348/85 |
| 2012/0312099 | A1* | 12/2012 | Russhard | F01D 17/02 73/660 |
| 2013/0113915 | A1 | 5/2013 | Scheid et al. | |
| 2013/0135457 | A1* | 5/2013 | Kell | F01D 25/285 348/82 |
| 2013/0335549 | A1* | 12/2013 | Hatcher, Jr. | G02B 23/2484 348/82 |
| 2014/0118423 | A1 | 5/2014 | Hasegawa et al. | |
| 2015/0308337 | A1 | 10/2015 | Marasco et al. | |
| 2019/0032506 | A1* | 1/2019 | Thompson | G01H 9/00 |

FOREIGN PATENT DOCUMENTS

| | | | |
|---|---|---|---|
| EP | 1609957 | A2 | 12/2005 |
| EP | 2597273 | A2 | 5/2013 |
| WO | WO 2015130870 | A1 | 9/2015 |

* cited by examiner

METHOD FOR CLEAR POSITION DETERMINATION AND IDENTIFICATION OF A TURBINE BLADE

CROSS-REFERENCE TO PRIOR APPLICATIONS

This application is a U.S. National Stage Application under 35 U.S.C. § 371 of International Application No. PCT/EP2017/072052 filed on Sep. 4, 2017, and claims benefit to German Patent Application No. DE 10 2016 216 895.9 filed on Sep. 6, 2016. The International Application was published in German on Mar. 15, 2018 as WO 2018/046423 A1 under PCT Article 21(2).

FIELD

The present invention relates to methods for clear position determination and identification of a turbine blade of a high-pressure turbine stage of a gas turbine, particularly an aircraft engine.

BACKGROUND

The turbine blades of the high-pressure turbine belong to the most highly loaded components of a gas turbine or of an aircraft engine. At the same time, even slight damage or deviations from their respective original shape of the high-pressure turbine blades have a not inconsiderable influence on the efficiency of the gas turbine, which ultimately affects the fuel consumption.

Because of the particular loading, the high-pressure turbine blades are regularly overhauled or, if this is not possible, replaced by new parts. For this purpose, the gas turbine has to be broken down, at least to such an extent that the turbine blades of the high-pressure turbine can be removed. The previously removed turbine blades can be mounted again following a possibly time-consuming overhaul. As an alternative thereto, other turbine blades already overhauled in another way or new parts can be mounted, in order to keep the necessary maintenance time for the gas turbine as short as possible. The latter is important in particular in aircraft engines.

Turbine blades regularly have a unique serial number. For turbine blades of aircraft engines, this is necessary because of approval requirements. The serial numbers are arranged on the root of the turbine blades, with which the blades are fixed to the blade carrier of the engine, in order to avoid their coming directly into contact with the hot gas stream and being made unrecognizable thereby.

The disadvantage with the positioning of the serial number on the root of a turbine blade is that the serial numbers are no longer visible following the insertion of the turbine blades. Thus, in the case of a completely mounted gas turbine or a completely mounted aircraft engine, it is not possible to check the serial number of an individual engine blade. In order to determine the serial number of a specific engine blade, according to the prior art a virtually complete breakdown of the entire gas turbine is instead necessary.

In particular when overhauled turbine blades are used, even when checking of the turbine blades is carried out before and after the mounting, even shortly after the commissioning of the reassembled gas turbine, to some extent even after a first test run, an at least slightly reduced efficiency can be established, which ultimately results in an increased fuel consumption in the use of the gas turbine. Even if a correspondingly reduced efficiency frequently does not justify any renewed disassembly of the gas turbine, it may be wished, for many reasons, to clearly identify the component causing the loss of efficiency of the gas turbine. For example, appropriate identification is desirable in order to be able to make possible compensation claims on the manufacturer of a clearly identifiable component or on the maintenance facility which has overhauled the questionable component.

If a turbine blade of the high-pressure turbine of the aircraft engine is identified as a probable cause of the loss of efficiency, it is impossible in the prior art, however, to identify the turbine blade in question clearly, for example by using its serial number, without a virtually complete breakdown of the gas turbine. As a result, the origin of the turbine blade from a manufacturer or repair facility cannot readily be clarified.

The documents DE 10 2011 114 541 A1, EP 1 609 957 A2, US 2013/0 113 915 A1, US 2014/0 188 423 A1 or WO 2015/130 870 A1—disclose diverse methods, including partially automated methods, for the boroscopic inspection of turbine blades or other components in a completely mounted aircraft engine. However, a possible way of identifying the turbine blades visible by the boroscope is not described.

The documents DE 10 2011 103 003 A1 and U.S. Pat. No. 9,016,560 B2 disclose automated optical methods for checking disassembled engine blades, wherein the serial numbers provided on the blade root can be configured to be machine-readable.

SUMMARY

An embodiment of the present invention provides a method for a position determination of a turbine blade of a high-pressure turbine stage of a gas turbine that is connected to a high-pressure compressor via a shaft, where each turbine blade, which includes the turbine blade, of the high-pressure turbine is recorded on a record card in an identifiable manner with the relative position thereof. The method includes the steps: determining a position of a predefined blade lock of a predefined stage of the high-pressure compressor, where the predefined stage of the high-pressure compressor is selected such that, in a completely mounted state of the gas turbine, the predefined blade lock is capable of being brought into a field of view of a first boroscope, which is guided through a first boroscope opening on the gas turbine by rotating the shaft, and so that the predefined blade lock can be identified; and marking that turbine blade on the record card which, in the completely mounted state of the gas turbine, is in the field of view of a second boroscope, which is guided through a second boroscope opening on the gas turbine when the predefined blade lock is in the field of view of the first boroscope.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
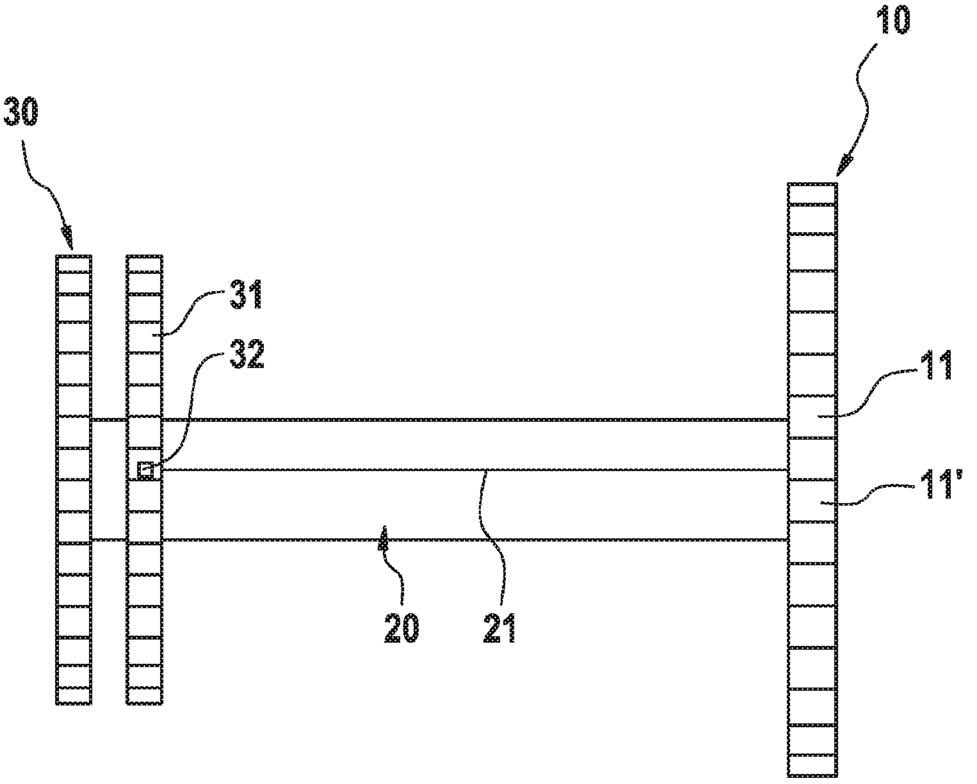
FIG. 1 shows a high-pressure turbine stage having a high-pressure compressor connected via a shaft.

Embodiments of the present invention provide methods with which clear position determination and identification of a turbine blade of a high-pressure turbine stage of a gas turbine is possible without disassembly of the gas turbine being necessary for the identification.

Embodiments of the present invention provide a method for the clear position determination of a turbine blade of a high-pressure turbine stage of a gas turbine that is connected to a high-pressure compressor via a shaft, where each turbine blade of the high-pressure turbine is recorded on a record card in a clearly identifiable manner with the relative position thereof, including the steps:

a. determining the position of a predefined blade lock of a predefined stage of the high-pressure compressor, where the stage of the high-pressure compressor is selected such that, in the completely mounted state of the gas turbine, the blade lock can be brought into the field of view of a first boroscope guided through a first boroscope opening on the gas turbine by rotating the shaft and be identified clearly; and b. marking that turbine blade on the record card which, in the completely mounted state of the gas turbine, is in the field of view of a second boroscope guided through a second boroscope opening on the gas turbine when the predefined blade lock is in the field of view of the first boroscope.

Furthermore, embodiments of the invention provide a method for the clear identification of the turbine blade of the high-pressure turbine of a gas turbine, which is marked on the record card by the above method according to the invention, including the steps:

a. inserting a first boroscope through a first boroscope opening on the gas turbine and a second boroscope through a second boroscope opening on the gas turbine; and b. rotating the shaft connecting the high-pressure compressor and the high-pressure turbine stage until the predefined blade lock is in the field of view of the first boroscope, whereby the turbine blade marked on the record card is in the field of view of the second boroscope.

First of all, some terms used within the context of the invention will be explained.

Known in gas turbines and usual in aircraft engines are "record cards", on which the "relative positions" of the individual turbine or compressor blades of a gas turbine stage are recorded. All the blades used in the gas turbine stage are listed on the record card by using their serial number. Furthermore, the order of the individual blades in the circumferential direction is given by the record card. In other words, by using the record card, it is possible to determine for each blade of the gas turbine which two blades are respectively arranged adjacent thereto. However, the record card only gives information about the relative position of the blades but not the absolute position, for example with respect to the shaft.

Blades of gas turbines and aircraft engines include an aerofoil and a blade root. The blade root usually has a shape such that it permits the blade root to be inserted into a blade groove of the blade carrier for a turbine stage. In order to secure one or more blades in the blade groove, one or more "blade locks" are provided, with which the blades are fixed in their position relative to the blade carrier.

The invention is based on the finding that the regions of the high-pressure turbine that can be seen through a second boroscope in a completely mounted gas turbine are subjected to the special loading by the hot gases originating from the combustion chamber, for which reason all markings applied in this region would be removed or burned out at the latest with a first test run of the gas turbine. Because of the special loading in this region, the high-pressure turbines are also regularly configured such that, with the gas turbine completely mounted, the surfaces of the high-pressure turbine that can be seen through a second boroscope do not permit any conclusions as to their angular position and so on.

However, the invention has recognized that, even in a completely mounted gas turbine, the high-pressure compressor rotationally fixedly connected to the high-pressure turbine via a shaft has blade locks that are clearly identifiable through a first boroscope and can be used as a detection feature for the angular position of the high-pressure compressor and therefore the high-pressure turbine. Given knowledge of the positions of boroscope openings for the first and the second boroscope, it is possible to establish accurately which turbine blade is in the field of view of the second boroscope when the predefined blade lock is in the field of view of the first boroscope.

Because this relationship is recorded on the record card during the mounting of the high-pressure turbine, according to the invention, by using this information on the record card, a first turbine blade can firstly be identified clearly with the gas turbine completely mounted. By means of subsequent rotation of the high-pressure compressor by a predefined angle or with simultaneous observation by means of the second boroscope, the other turbine blades can also be identified clearly by using the relative position of the turbine blades recorded on the record card.

In order to facilitate the determination of the turbine blade to be marked on the record card, it is preferable if the angular position of the predefined blade lock of the high-pressure compressor relative to the shaft is firstly marked on the shaft itself and the turbine blade to be marked on the record card is determined starting from this marking. The marking can be brought along the shaft as far as the high-pressure turbine, which means the identification of the turbine blade in question is simplified. The marking can be made, for example, by a marking pen according to the DIN LN 9051 standard.

Alternatively or additionally, the determination of the turbine blade to be marked on the record card can be facilitated if the turbine blades have a temporary identification feature that is visible following the mounting. Thus, for example, the serial number of the individual turbine blades can be applied directly to the aerofoil, that is to say at a point which is also visible after the installation of the turbine blade. Such an identification feature that is also visible in the installed state is in principle a temporary identification feature which, following a first test run of the gas turbine, is already burned without residue on account of the particular loadings in the region of the high-pressure turbine.

If there are more than two blade locks in the predefined stage of the high-pressure compressor, a first and a second blade lock can usually be identified clearly. This is because the distance between the first blade lock and the second blade lock in the circumferential direction counter to a predefined direction of rotation is usually smaller than the corresponding distance between the last blade lock—which can also be the second blade lock—and the first blade lock. Starting from the first blade lock that is thus clearly identifiable, the second blade lock is the blade lock following the first blade lock in the circumferential direction in the predefined direction of rotation. It is preferable if the predefined blade lock is the second blade lock. As explained below, as a result the subsequent identification of the turbine marked on the record card can be facilitated.

According to the invention, if a turbine blade is marked on the record card, this turbine blade is clearly identifiable even in a completely mounted gas turbine.

To this end, a first boroscope is guided through a first boroscope opening on the gas turbine and a second boroscope is guided through a second boroscope opening on the gas turbine. The first boroscope opening is arranged such that the predefined blade lock of the predefined stage of the high-pressure compressor can be viewed through a boroscope guided through, while the second boroscope opening permits observation of the turbine blades of the relevant high-pressure turbine stage with the aid of a boroscope.

Following insertion of at least the first boroscope—the second boroscope can also be inserted later—the shaft on which both the high-pressure compressor and the high-pressure turbine stage are mounted rotates until the predefined blade lock is in the field of view of the first boroscope. The turbine blade which is then visible through the second boroscope, which is then inserted about now, is then the turbine blade marked on the record card.

If the predefined blade lock is the second blade lock of the predefined stage of the high-pressure compressor, the rotational speed can preferably be reduced following detection of the first blade lock through the second boroscope in order to be able to stop the shaft as far as possible without delay as soon as the second blade lock is in the field of view of the first boroscope. In other words, the rotational speed can initially be comparatively high in order to rotate the shaft quickly into the region in which the second blade lock is located, in order then, on account of a comparatively low rotational speed, to be able to stop the shaft directly as soon as the second blade lock comes into the field of view of the first boroscope.

Once the turbine blade marked on the record card has been identified clearly, preferably by means of subsequent rotation of the shaft connecting the high-pressure compressor and the high-pressure turbine stage while observing the turbine blades through the second boroscope or while observing the change in the angular position of the shaft, at least one turbine blade is identified by using the record card. Since, on the record card, the relative position of the individual turbine blades emerges, starting from the clearly identified marked turbine blade, the respective adjacent turbine blades and the turbine blades adjacent thereto can be identified one after another. Since the fundamental geometric configuration of the turbine blades of a gas turbine is known, it is also possible, via the angular position of the shaft and starting from the angular position assumed by the shaft during the identification of the marked turbine blade, for a turbine blade not adjacent to the marked turbine blade also to be identified directly.

The invention will now be described by way of example by using an exemplary embodiment and with reference to the appended drawings.

Figure 3:
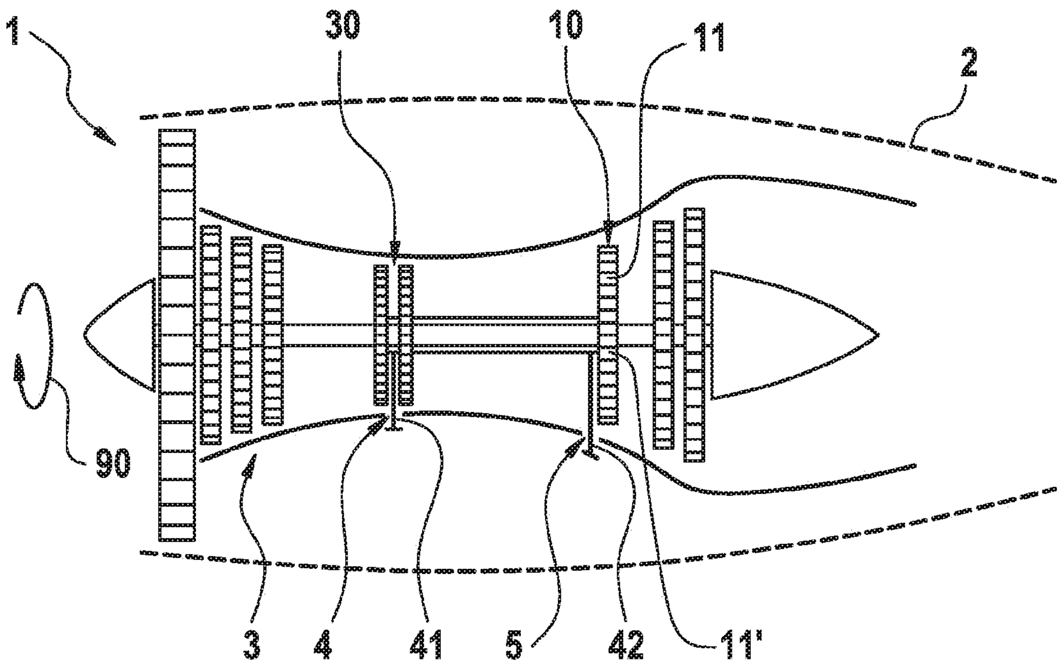
FIG. 3 shows an aircraft engine with the high-pressure turbine stage and the high-pressure compressor according to FIG. 1.

FIG. 1 is a schematic illustration of a high-pressure turbine stage 10 of a gas turbine 1 or of an aircraft engine 1 (see FIG. 3). The high-pressure turbine stage 10 has a multiplicity of turbine blades 11, the respective serial number of which is engraved on the blade foot and recorded on a record card in the relative position thereof. A record card can have the form of a list of serial numbers, wherein the order of the listing corresponds to the arrangement of the turbine blades in the circumferential direction of the high-pressure turbine stage.

The high-pressure turbine stage 10 is rotationally fixedly connected via a shaft 20 to a two-stage high-pressure compressor 30. Each of the two stages of the high-pressure compressor 30 includes a multiplicity of compressor blades 31, which are secured in their position with respect to the blade carrier of the respective stage of the high-pressure compressor 30 via respectively two blade locks 32 (only one blade lock 32 is visible in the illustration according to FIG. 1).

Figure 2:
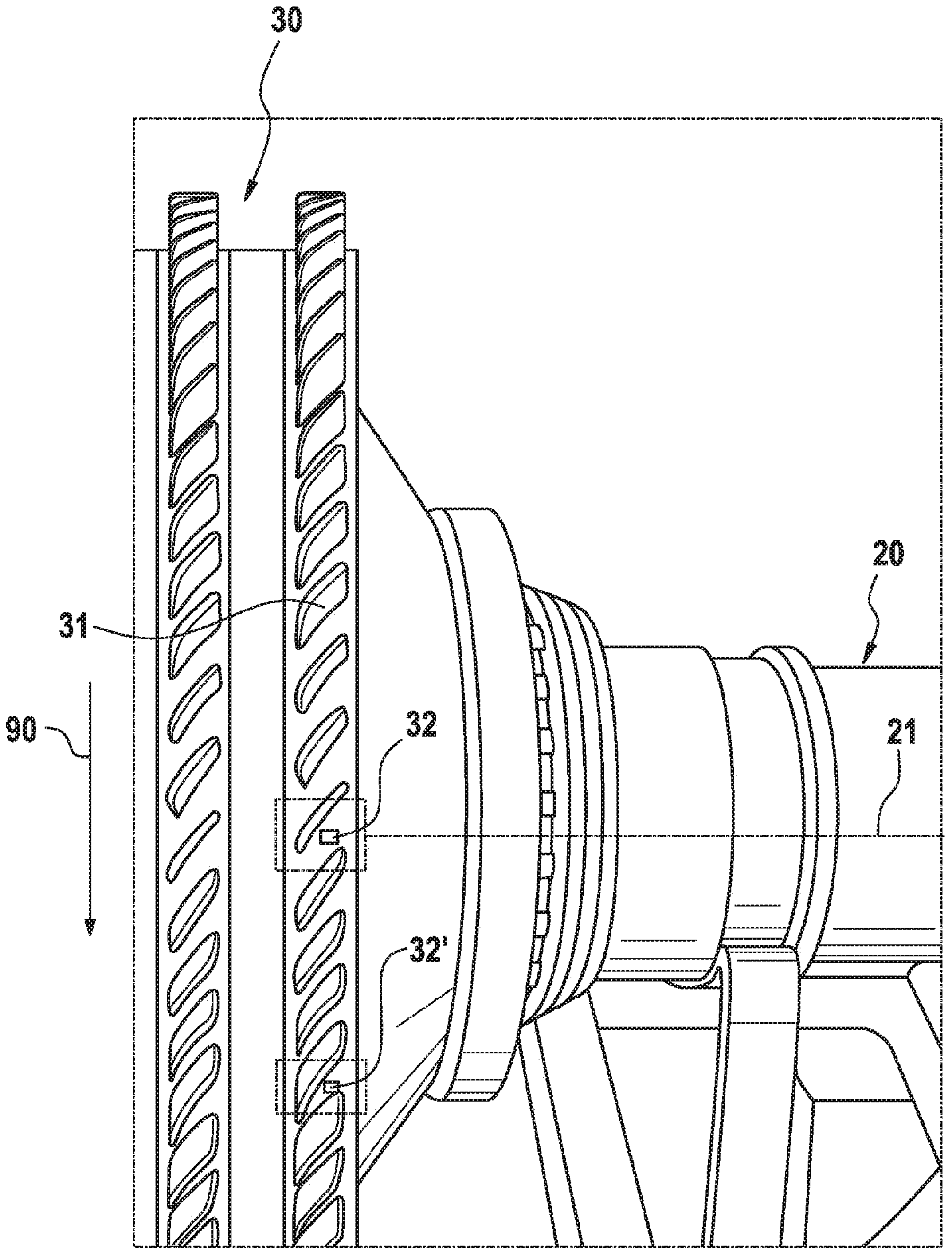
FIG. 2 shows a detailed illustration of the high-pressure compressor from FIG. 1.

In FIG. 2, the high-pressure compressor 30 from FIG. 1 is illustrated on an enlarged scale. Between the blades 31 of the one stage of the high-pressure compressor 30, two blade locks 32, 32' can be seen. Here, the distance between the first blade lock 32' and the second blade lock 32 in the circumferential direction counter to the predefined direction of rotation 90—which does not have to coincide with the direction of rotation of the aircraft engine 1 during operation—is smaller than the distance between the second and last blade lock 32 in the direction of rotation and the first blade lock 32'.

The blade lock 32, thus identified as the second blade lock 32, is used as a basis for the marking 21 along the shaft 20, which is applied with an aviation-certified marking pen. The marking 21 indicates the angular position of the blade lock 32 relative to the axis of the shaft 20. Starting from this marking, that turbine blade 11' can be marked on the record card which—as explained below by using FIG. 3—in the fully mounted state of the aircraft engine 1 is in the field of view of a second boroscope 42 guided through a second boroscope opening 5 on the aircraft engine 1 when the predefined blade 32 is in the field of view of a first boroscope 41 guided through a first boroscope opening 4 of the aircraft engine 1.

In FIG. 3, the aircraft engine 1 is illustrated in the completely mounted state. Only the turbine covering 2 has been opened (and is therefore illustrated dashed) in order to have access to the core engine 3.

For the clear identification of the turbine blade 11' of the high-pressure turbine 10 that is marked on the record card, the shaft 20 is rotated at a first rotational speed in the direction of rotation 90. As soon as the first blade lock 32' can be detected through the first boroscope 41, the rotational speed is reduced and the shaft 20 is stopped as soon as the second blade lock 32 is in the field of view of the first boroscope 41.

Once the second blade lock 32 is located in the field of view of the first boroscope 41, because of the position determination previously carried out of the turbine blade 11 in question, the turbine blade 11 marked on the record card is directly in the field of view of the second boroscope 42. The remaining turbine blades 11 can then be identified clearly by using the record card, starting from the marked turbine blade 11'.

During the mounting, markings possibly provided on the turbine blades 11, which can also facilitate the position determination of the turbine blade 11' to be marked, are removed completely at the latest following the first test run of the aircraft engine 1. However, by means of the method according to the invention, it is firstly possible to identify a turbine blade 11'—namely the one previously marked on the record card—without any identification features on the turbine blade 11' or the high-pressure turbine 10 itself.

Starting from this turbine blade 11', with the aid of the record card, the other turbine blades 11 can also be identified clearly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for a position determination of a turbine blade of a high-pressure turbine stage of a gas turbine that is connected to a high-pressure compressor via a shaft, wherein each turbine blade, which comprises the turbine blade, of the high-pressure turbine is recorded on a record card in an identifiable manner with a relative position thereof, the method comprising:

a. determining a position of a predefined blade lock of a predefined stage of the high-pressure compressor, wherein the predefined stage of the high-pressure compressor is selected such that, in a completely mounted state of the gas turbine, the predefined blade lock is capable of being brought into a field of view of a first boroscope, which is guided through a first boroscope opening on the gas turbine by rotating the shaft, and so that the predefined blade lock can be identified; and b. marking that turbine blade on the record card which, in the completely mounted state of the gas turbine, is in the field of view of a second boroscope, which is guided through a second boroscope opening on the gas turbine when the predefined blade lock is in the field of view of the first boroscope.

2. The method as claimed in claim 1, wherein there is a first blade lock and a second blade lock in the predefined stage of the high-pressure compressor, the second blade lock being the predefined blade lock, and wherein a first distance between the first blade lock and the second blade lock in the circumferential direction counter to a predefined direction of rotation is smaller than a second distance between the second blade lock and the first blade lock in the circumferential direction counter to the predefined direction of rotation.

3. The method as claimed in claim 1, wherein an angular position of the predefined blade lock relative to the shaft is marked on the shaft and, starting from this marking, the turbine blade to be marked on the record card is determined.

4. The method as claimed in claim 1, wherein the turbine blades have an identification feature which is visible following the mounting in the high-pressure turbine stage and which is removed by the operation of the gas turbine.

5. A method for a identification of a turbine blade of a high-pressure turbine of a gas turbine which is marked on a record card by a method, comprising the steps:

a. inserting a first boroscope through a first boroscope opening on the gas turbine and a second boroscope through a second boroscope opening on the gas turbine; and b. rotating the shaft connecting the high-pressure compressor and the high-pressure turbine stage until a predefined blade lock is in a field of view of the first boroscope, whereby the turbine blade marked on the record card is in a field of view of the second boroscope.

6. The method as claimed in claim 5, wherein there is a first blade lock and a second blade lock, the second blade lock being the predefined blade lock, wherein a rotational speed is reduced following detection of the first blade lock through the first boroscope in order to stop the shaft without delay when the second blade lock is in the field of view of the first boroscope.

7. The method as claimed in claim 5, wherein following the identification of the turbine blades marked on the record card, via a subsequent rotation of the shaft connecting the high-pressure compressor and the high-pressure turbine stage while observing the turbine blades through the second boroscope and/or while observing a change in an angular position of the shaft, at least one further turbine blade is identified by using the record card.

* * * * *